Sept. 19, 1961 H. W. WELSH 3,000,613
ROTOR BLADE LOCK
Filed June 11, 1958

INVENTOR.
Harvey W. Welsh
BY
Paul Fitzpatrick
ATTORNEY

United States Patent Office 3,000,613
Patented Sept. 19, 1961

3,000,613
ROTOR BLADE LOCK
Harvey W. Welsh, Indianapolis, Ind., assignor to General Motors Corporation, Detroit, Mich., a corporation of Delaware
Filed June 11, 1958, Ser. No. 741,271
6 Claims. (Cl. 253—77)

My invention relates to blade locks for rotary machines, such, for example, as compressors and turbines. It is customary in such machines to mount a row of blades on the periphery of a disk or other rotor structure by sliding the roots of the blades into dovetail grooves extending more or less axially across a rim or flange on the rotor. Some arrangement must be provided to hold or lock the blades in place in the slots, and many arrangements for this purpose have been proposed.

My invention is directed to a blade lock which is particularly advantageous from the standpoints of positive retention of the blade, ease of application and removal of the lock, light weight, and simplicity of structure leading to manufacturing economies.

The principal objects of the invention are to improve the retention of blades on turbomachine rotors and to provide an improved blade lock for such machines.

The nature of the invention and the advantages thereof will be clear to those skilled in the art from the succeeding detailed description and drawings of the preferred embodiments of the invention.

Figure 1:
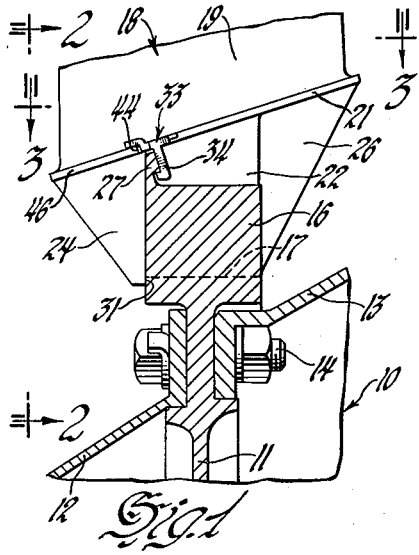
FIGURE 1 is a fragmentary sectional view of an axial flow compressor rotor taken on a plane containing the axis of the rotor.
Figure 2:
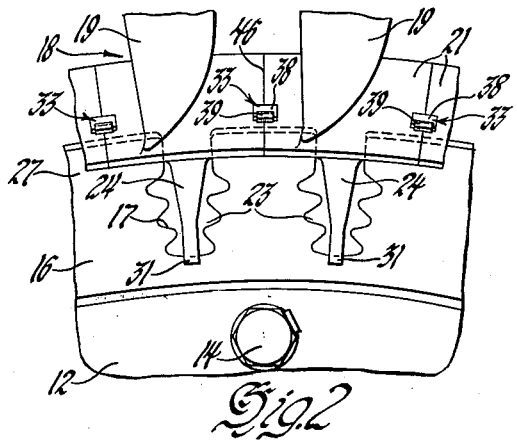
FIGURE 2 is a fragmentary front elevation view of the same taken on the plane indicated by the line 2—2 in FIGURE 1.

Referring first to FIGURES 1 and 2 for a description of an illustrative embodiment of the invention, a compressor rotor 10 comprises one or more disks 11, only one of which is shown. The disks may be connected by spacer rings such as 12 and 13 fixed to the disk 11 adjacent the rim thereof by bolts and nuts 14. The disk 11 has a relatively heavy rim or flange 16 in which are cut dovetail slots 17 extending across the rim of the wheel. These slots may be parallel to the axis or may be inclined or skewed with respect to the axis.

A number of rotor blades 18 are mounted on the rim 16 of disk 11. Each blade comprises an air foil or blade portion 19, a blade platform 21, a stalk 22, and a root 23, the root being configured for mounting in the slot 17. The stalk connects the root to the platform and the airfoil extends outwardly from the platform. The platforms of adjacent blades abut to provide the inner boundary of the flow path through the rotor stage. Webs 24 and 26 extend from the forward and rear faces of the root and stalk to the blade platform. An interrupted air baffle flange 27 extends from the rim to close the spaces between the stalks 22. It will be understood that the rotor structure so far described is merely illustrative of one type of rotor structure to which the invention may be applied.

The blade lock of this invention is particularly adapted to use in installations in which the lock need only hold the blade against movement in one direction out of the slot. In this installation, the blade root projects below the bottom of the blade slot to provide an abutment against the forward face of the rim at 31 when the blade is in its normal mounted position in the disk 11. The centrifugal forces or the gas load on the blade may be such as to urge the abutment 31 against the forward face of the wheel. The blade lock, therefore, need only restrain the blade against movement forwardly out of the wheel.

Figure 4:
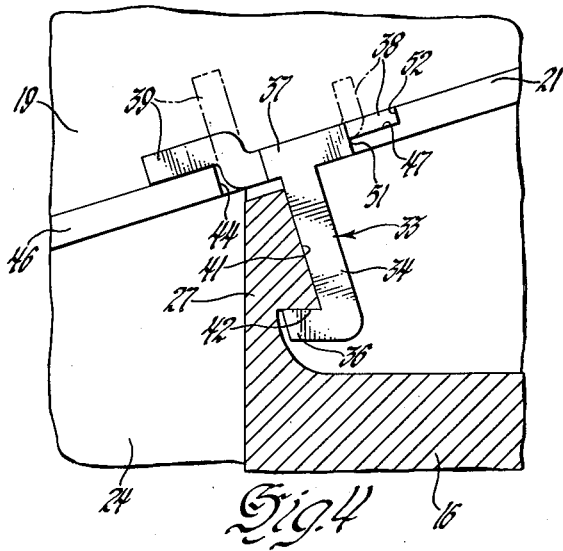
FIGURE 4 is an enlarged view of a portion of FIGURE 1.
Figure 6:
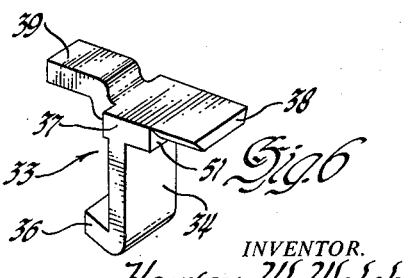
FIGURE 6 is an axonometric view of a lock member.

The blade locking member 33 of the invention, as shown most clearly in FIGURES 4 and 6, comprises a body 34, a hook 36, which is slightly recurved or hooked with respect to one end of the body, and a head or flange 37 at the other end of the body. Head 37 has two deformable tabs 38 and 39, shown in solid lines in the drawings in their position after the blade is locked and shown in broken lines in FIGURE 4 as they project before the blade locking member has been mounted. The body 34 of the locking member abuts a shoulder 41 defined by the rearward face of the air baffle flange 27. The hook 36 engages a radially inwardly facing surface 42 defined by an undercut in the air baffle flange.

Figure 3:
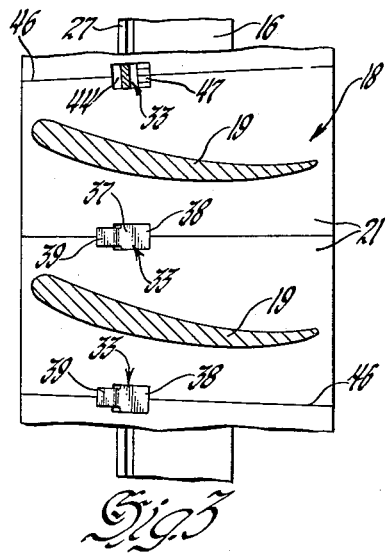
FIGURE 3 is a fragmentary sectional view taken on the plane indicated by the line 3—3 in FIGURE 1, with parts cut away.

The head 37 is received in an opening in the blade platform 21. In the form of the invention illustrated in FIGURES 1 to 4, the opening 44 is in the edge 46 of the blade platform which lies adjacent the edge 46 of the platform of the adjacent blade. As will be apparent from FIGURES 2 and 3, the openings are provided in both edges 46 of the platform so that, when two adjacent blades are inserted, a single opening, half of which is in each platform, is provided. A recess 47 extending rearwardly from the opening 44 is provided to receive the tab 38 when it is bent down into its final position.

Figure 5:
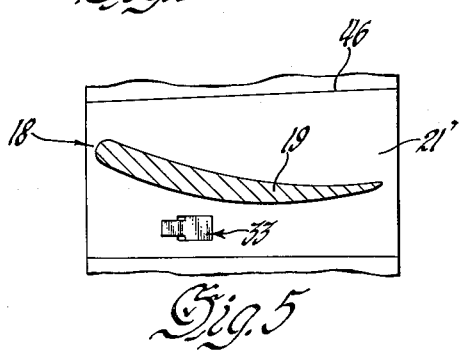
FIGURE 5 is a fragmentary view similar to FIGURE 3 of a modified form of the invention.

In the form of the invention shown in FIGURE 5, the opening 44 is entirely bounded by the platform 21' of a single blade, but the structure is otherwise the same.

The manner of assembly of the structure is as follows. The blades are mounted on the rotor by sliding the roots 23 into the slots 17 until the abutment 31 engages the face of the wheel. The locking members 33 are put in place by inserting the hook 36 through the opening 44 and catching the hook 36 under the surface 42. Tab 38 is then bent down into the recess 47 and tab 39 is bent down to lie against the outer surface of the platform or platforms 21. The projections 38 and 39 hold the retaining member outwardly so that the hook 36 cannot become detached from the undercut surface 42 of the flange 27. The blade cannot move forwardly out of the slot because of the abutment of the forward face of the body 34 against the rear face 41 of flange 27. The forwardly facing surface 51 of the opening 44 below the recess 38 engages the head 37, and also the end of projection 38 may engage a radial surface 52 at the rear end of recess 47. Thus, the retaining member cannot come out and the blade cannot move forward.

In order to remove a blade in the form of FIGURES 1 to 4, it is only necessary to bend up the projections 39 and 38 of the retainers 33 at each side of the blade, remove the retaining members by the reverse of the process of inserting them, and slide the blade out of the disk. In the form of FIGURE 5 it is necessary to remove only one retaining member 33 to remove a defective blade. This is an advantage of the form of FIGURE 5. On the other hand, however, it is somewhat easier to provide the openings 44 for the retaining members in the edges of the platform, rather than completely within the platform as in FIGURE 5.

It will be appreciated that the effect of centrifugal force on the retaining member is resisted by the hook 36 which may be amply strong for this purpose. It will be apparent to those skilled in the art that the blade locking means of the invention is extremely simple, light in weight, reliable, and easy to apply and remove.

The detailed description of the preferred embodiments

I claim:

1. A rotor assembly for a turbomachine comprising, in combination, a rotor having a blade receiving slot in the periphery thereof; a blade including a root slidably mounted in the slot; means on said blade and rotor together preventing movement of the root in one direction in the slot; means providing a shoulder on the rotor facing in the said one direction and an undercut in the shoulder having a radially inwardly facing surface; the blade including a platform overlying the shoulder and with an opening through the platform adjacent the shoulder; and a blade locking member including a body extending through the opening and abutting the shoulder, a hook on the body abutting the said surface, and means on the body engaging the radially outer surface of the platform to retain the hook against the said surface.

2. A rotor assembly for a turbomachine comprising, in combination, a rotor having a blade receiving slot in the periphery thereof; a blade including a root slidably mounted in the slot; means on said blade and rotor together preventing movement of the root in one direction in the slot; means providing a shoulder on the rotor facing in the said one direction and an undercut in the shoulder having a radially inwardly facing surface; the blade including a platform overlying the shoulder and with an opening through the platform adjacent the shoulder, and a blade locking member including a body extending through the opening and abutting the shoulder, a hook on the body abutting the said surface, and deformable projections on the body deformable to engage the radially outer surface of the platform to retain the hook against the said surface.

3. A rotor assembly for a turbomachine comprising, in combination, a rotor having blade receiving slots in the periphery thereof; blades having roots slidably mounted in the slots; means on said blade roots and rotor together preventing movement of the roots in one direction in the slots; means providing a shoulder on the rotor facing in the said one direction and an undercut in the shoulder having a radially inwardly facing surface; the blades including platforms overlying the shoulder and defining openings through the platforms adjacent the shoulder; and blade locking members each including a body extending through a said opening and abutting the shoulder, a hook on the body abutting the said surface, and deformable projections on the body deformable to engage the radially outer surface of the platforms to retain the hook against the said surface.

4. A rotor assembly as recited in claim 3 in which the openings are each bounded by a single blade platform.

5. A rotor assembly as recited in claim 3 in which the platforms of the blades are mutually adjacent one another and openings are bounded by marginal portions of the mutually adjacent blade platforms.

6. A rotor assembly for a turbomachine comprising, in combination, a rotor having a blade receiving slot in the periphery thereof; a blade including a root slidably mounted in the slot; means on said blade and rotor together preventing movement of the root in one direction in the slot; means providing a shoulder on the rotor facing in the said one direction and an undercut in the shoulder having a radially inwardly facing surface; the blade including a platform overlying the shoulder and with an opening through the platform adjacent the shoulder; and a blade locking member including a body extending through the opening and abutting the shoulder, a hook on the body abutting the said surface, and a head on the body conforming to the opening and having deformable projections on the head deformable to engage the radially outer surface of the platform to retain the hook against the said surface.

References Cited in the file of this patent

UNITED STATES PATENTS

| | | |
|---|---|---|
| 986,317 | Schmidt | Mar. 7, 1911 |

FOREIGN PATENTS

| | | |
|---|---|---|
| 812,337 | Germany | Aug. 27, 1951 |
| 916,295 | France | Aug. 19, 1946 |